US008201369B2

(12) United States Patent
Coughlin (10) Patent No.: US 8,201,369 B2
(45) Date of Patent: Jun. 19, 2012

(54) SYSTEM AND METHOD FOR PASSING CONDUITS THROUGH STRUCTURAL MEMBERS WITH MINIMAL ADVERSE EFFECT

(76) Inventor: Arthur Raymond Coughlin, Cabot, AR (US)

( * ) Notice: Subject to any disclaimer, the term of this patent is extended or adjusted under 35 U.S.C. 154(b) by 384 days.

(21) Appl. No.: 12/175,000

(22) Filed: Jul. 17, 2008

(65) Prior Publication Data

US 2010/0012791 A1 Jan. 21, 2010

(51) Int. Cl.
*E04C 3/12* (2006.01)
*E04C 3/16* (2006.01)

(52) U.S. Cl. ........... 52/220.3; 52/16; 52/220.8; 285/179

(58) Field of Classification Search ............ 52/220.1, 52/220.2, 220.7, 220.3, 220.8, 16; 285/133.3, 285/133.6, 148.23, 179; 239/593; 138/DIG. 1, 138/118

See application file for complete search history.

(56) References Cited

U.S. PATENT DOCUMENTS

| | | | | |
|---|---|---|---|---|
| 455,910 A * | 7/1891 | Gordon | ...................... | 285/183 |
| 772,350 A * | 10/1904 | Fellheimer | ................... | 52/220.3 |
| 814,217 A * | 3/1906 | Knight et al. | ................ | 285/149.1 |
| 1,287,108 A * | 12/1918 | Robinson et al. | ............... | 285/119 |
| 1,774,151 A * | 8/1930 | Olley | ................................ | 174/81 |
| 1,829,054 A * | 10/1931 | Olley | ................................ | 174/81 |
| 1,862,831 A * | 6/1932 | Ryan | .................................. | 52/259 |
| 1,901,897 A * | 3/1933 | Clayton | ....................... | 285/149.1 |
| 2,171,023 A * | 8/1939 | Buxton | ........................... | 239/602 |
| 2,183,271 A * | 12/1939 | Wendel | ........................ | 285/289.5 |
| 2,297,179 A * | 9/1942 | Walker | .......................... | 52/220.1 |
| 2,509,782 A * | 5/1950 | Person, Jr. | ..................... | 285/183 |
| 2,590,392 A * | 3/1952 | Feilden | .......................... | 285/226 |
| 2,654,619 A * | 10/1953 | Gaum | ....................... | 285/148.23 |
| 2,751,652 A * | 6/1956 | Epstein | ............................ | 248/57 |
| 2,823,701 A * | 2/1958 | Burk | .............................. | 138/103 |
| 3,263,244 A * | 8/1966 | Katz | ............................... | 4/252.4 |
| 3,442,058 A * | 5/1969 | Naslund et al. | ............... | 174/482 |
| 3,626,987 A * | 12/1971 | Bittner | .......................... | 138/114 |
| 3,920,271 A * | 11/1975 | Bluestone | ............... | 285/148.22 |
| 4,165,592 A * | 8/1979 | Blankenship | ................. | 174/483 |
| 4,467,837 A * | 8/1984 | Baker | .......................... | 138/119 |
| 4,578,914 A * | 4/1986 | Staples | ........................ | 52/220.2 |
| 5,519,971 A * | 5/1996 | Ramirez | ...................... | 52/220.2 |
| 5,606,867 A * | 3/1997 | Mangyo et al. | .................. | 62/298 |
| 5,813,701 A * | 9/1998 | Noble | ............................. | 285/4 |
| 5,848,512 A * | 12/1998 | Conn | ............................. | 52/837 |
| 6,131,616 A * | 10/2000 | Tatsuta et al. | ................. | 138/121 |

(Continued)

*Primary Examiner* — Phi Dieu Tran A
(74) *Attorney, Agent, or Firm* — Donald R. Boys; Central Coast Patent Agency, Inc.

(57) ABSTRACT

A conduit adapter system enables routing of conduit through one or more structural members of width W with minimal weakening of the structural member or members, and includes a first section of conventional round conduit on one side of the structural member or members, and a second piece of round conduit on an opposite side of the structural member or members, and a bridge conduit section of sufficient length to pass through the structural member or members, the bridge conduit section having a symmetrical cross-section with a first dimension significantly less than a second dimension, and an area at least as large as the area of the round conduit sections. The bridge conduit section passes through an opening through the structural member or members of substantially the shape of the cross-section of the bridge conduit section such that the first, smaller dimension of the opening is in the direction of width W of the structural member, and is joined by adapter sections to the round conduit on each side of the structural member or members.

8 Claims, 7 Drawing Sheets

U.S. PATENT DOCUMENTS

| | | | |
|---|---|---|---|
| 6,612,075 B1* | 9/2003 | Knoop et al. | 52/16 |
| 7,017,310 B2* | 3/2006 | Brunt | 52/220.1 |
| 7,017,614 B2* | 3/2006 | Handley | 138/109 |
| 7,458,532 B2* | 12/2008 | Sloan | 239/593 |
| 7,677,271 B2* | 3/2010 | Boettner et al. | 138/119 |
| 2008/0263974 A1* | 10/2008 | Veckenstedt et al. | 52/220.1 |

* cited by examiner

SYSTEM AND METHOD FOR PASSING CONDUITS THROUGH STRUCTURAL MEMBERS WITH MINIMAL ADVERSE EFFECT

BACKGROUND OF THE INVENTION

1. Field of the Invention

The present invention is in the field of construction and pertains more particularly to conduit systems passing through structural members for electrical, venting, and plumbing requirements of the construction.

2. Discussion of the State of the Art

In the field of construction, building codes exist that govern how conduit systems are routed through structural members of a frame construction. A conduit system may be any system of pipes or jackets used to carry water (in the case of plumbing), air and other gases (in the case of venting systems), or electrical wiring (in the case of electrical systems and components).

One aspect of building code deals with holes or bores placed through structural members of a framed building including wall studs, floors, and ceilings. The code typically specifies a nominal diameter for a hole that may be placed through a support member without a requirement for adding additional structural support to compensate for the weakening of the structural member.

In current art systems, round holes are conventionally used to provide passage of a conduit section through a solid support or structural member. Although codes may vary from region to region, the nominal diameter is typically about two inches for conduit for plumbing or for carrying electrical wiring. At or over 2 inches in diameter the code typically requires some support element such as a Simpson brace to be installed at the site of the hole to compensate for the weakening of the structural member. Conduit systems may range in diameter from very small, say one inch or less in diameter, to eight or more inches for some venting requirements. In any case, holes placed in structural members above a specific diameter must be reinforced causing additional expense to the construction in labor and materials.

What is clearly needed in the art is an adapter system for routing a conduit through structural members in a manner that reduces or eliminates labor and materials for reinforcing structural members that have been prepared to accept the conduit system.

SUMMARY OF THE INVENTION

A problem stated above is that conventional conduit systems installed in construction must be routed through structural members of the construction in certain instances and that additional effort and materials must be applied to reinforce those structural members hosting the conduit system when the diameter of the bores placed through the structural members reaches a threshold size specified by building code. All conduit systems are standardized for construction and meet code requirements for serving their purposes in the construction.

The inventor therefore searched components of conduit systems and construction materials and methods looking for components and methods that could be modified economically to provide a conduit system of a diameter at or greater than the threshold size that could be routed through structural members without requiring code-specified reinforcement of those structural members.

In an inventive moment, the inventor conceived of a conduit adapter system that could be coupled with standard conduit system types for the purpose of bridging those conduit systems through structural members of the construction in a manner that reduces or eliminates the effort and materials otherwise required to reinforce structural route points in the construction. Use of the system resulted in less work and materials expense for construction projects.

Accordingly a conduit adapter system enabling routing of conduit through one or more structural members of width W with minimal weakening of the structural member or members is provided, comprising a first section of conventional round conduit on one side of the structural member or members, and a second piece of round conduit on an opposite side of the structural member or members, and a bridge conduit section of sufficient length to pass through the structural member or members, the bridge conduit section having a symmetrical cross-section with a first dimension significantly less than a second dimension, and an area at least as large as the area of the round conduit sections. The bridge conduit section passes through an opening through the structural member or members of substantially the shape of the cross-section of the bridge conduit section such that the first, smaller dimension of the opening is in the direction of width W of the structural member, and is joined by adapter sections to the round conduit on each side of the structural member or members.

In another aspect of the invention, in a conduit system comprising typically round conduit sections, a method for routing through a structural member of width W with minimum weakening of the structural member is provided, comprising steps of (a) providing a bridge conduit section of sufficient length to pass through the structural member, the bridge conduit section having a symmetrical cross-section with a first dimension significantly less than a second dimension, and an area at least as large as the area of the round conduit sections; (b) forming an opening through the structural member of substantially the shape of the cross-section of the bridge conduit section such that the first, smaller dimension of the opening is in the direction of width W of the structural member; (c) passing the bridge conduit section through the opening in the structural member; and (d) adapting the bridge conduit to the round conduit with adapter units having the round conduit shape at one end and the bridge cross-section shape at the other.

DETAILED DESCRIPTION

As described above, a problem with certain diameter conduit systems is that when routing such systems through structural members the bore sizes required through the structural members significantly weaken those members requiring additional measures and materials in the construction to compensate.

Figure 1:
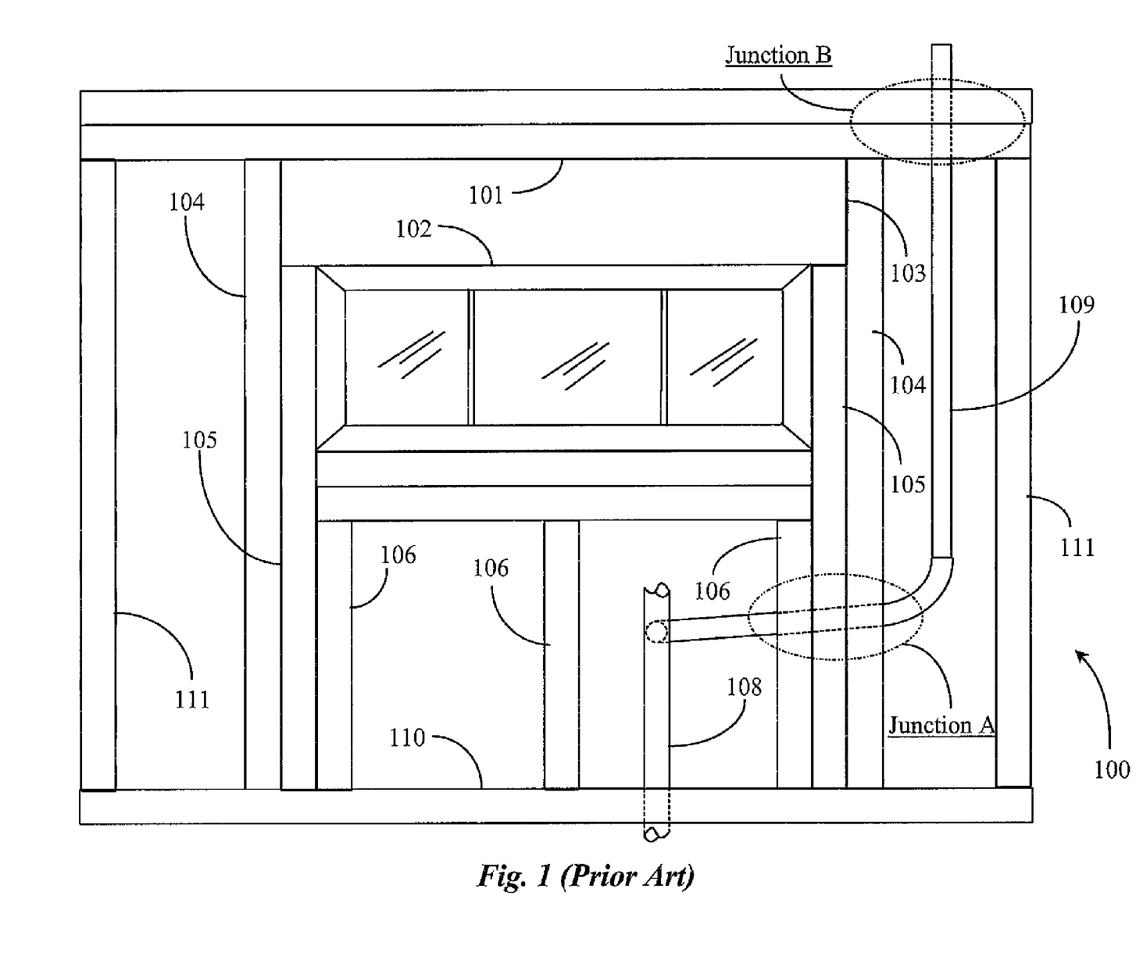
FIG. 1 is an elevation view of a conduit system routed through structural members of a construction according to existing practice.

FIG. 1 is an elevation view of a conduit system routed through structural members of a frame construction according to existing practice. A frame construction 100 is illustrated in this embodiment as a typical construction where conduit of some type would be required in the construction framework. Construction 100 is likened to a kitchen remodel or new kitchen construction in this example.

Frame construction 100 is typical for a kitchen area and includes support for a large picture or bay window 102. Window 102 may be any type of window but is likely to be a large bay window that provides a view for those working in the kitchen. The framework of construction 100 must be robust enough to support the weight of the window.

Construction 100 is bounded at either end by structural members 111 at both sides for framing purposes only. A bottom plate 110 is provided as the lower-most structural member of the framed construction, which includes the wall framing members supporting the window. A double top plate 101 provides a ceiling support or top of the construction 100. Certain structural members are required to support the weight of window 102. These include vertical 2×4 members and other structural members.

Window 102 is bounded on the outside of the framing by two vertical "king" studs 104. Two vertical "trimmer" studs 105 are provided adjacent to the king studs. These form the vertical frame support members on either side of window 102. Three vertical "cripple" studs 106 are illustrated in the construction beneath window 102 and the sill framing. These studs directly support the weight of window 102. A header 103 is installed in the construction directly above the window.

Generally speaking, a counter and sink including plumbing, cabinetry, and the like will be installed directly beneath the window with such elements tied into the structural framing of the construction including the mentioned studs. This example is just one example of a framing through which a conduit system will be routed and connected. In this case a conduit system installed for this construction area may involve kitchen plumbing for the sink, including a sink drain and vent, and perhaps plumbing to other appliances that require water.

A conduit system is illustrated in this example and includes a sink drain 108 and a sink drain vent pipe 109. Vent pipe 109 extends through double top plate 101 at a junction B. The conduit system is routed in the wall through all three studs 104, 105, and 106 at a junction A to reach the vertical sink drain installed under a kitchen sink. Sink drain 108 is routed either through the wall or through the bottom plate to a septic or sewer outlet outside of the home.

The diameter of the conduit system including sink drain 108 and vent pipe 109 may exceed the nominal diameters for which additional structural support must be applied to compensate for the bores placed through studs 104, 105, and 106, and through double top plate 101 and bottom plate 110. Simpson bracing or other types of metallic braces are required in this construction at junctions A and B. Without the required bracing, the vertical studs supporting the window on one side would be much weaker at junction A than the counterparts on the other side. The double top plate supporting the ceiling and other framing components would be weakened at the point of junction B without bracing.

It has occurred to the inventor that by altering the cross-sectional profile of the conduit at the junction points A and B, the conduit may be routed through those junctions without significantly weakening those structural members.

The inventor therefore constructed a unique conduit adapter system for routing conduit systems in construction through structural members in a fashion that requires no additional structural support to the host structural member hosting the junction. The invention is described in enabling detail using the following examples.

Figure 2:
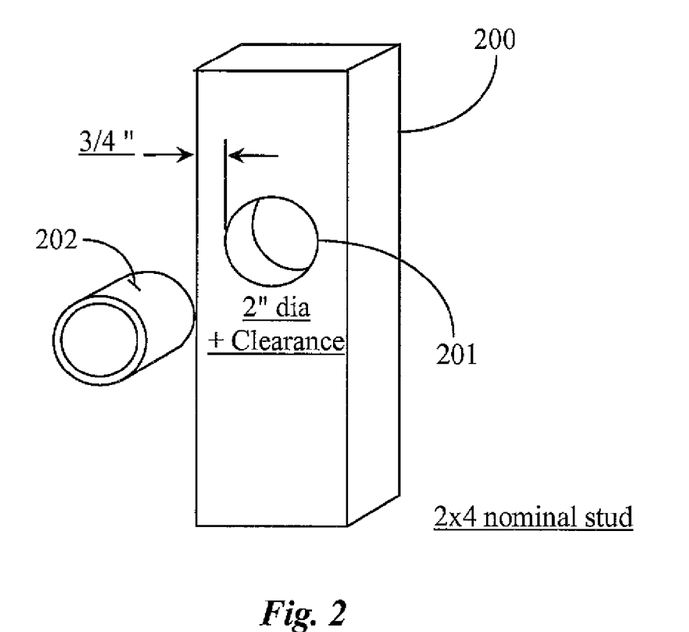
FIG. 2 is perspective view of a conduit system route-through junction according to the example of FIG. 1.

FIG. 2 is perspective view of a conduit route-through junction according to the example of FIG. 1. To further illustrate the problem with routing round conduit through structural members, a structural member 200 is illustrated in isolation from a construction framing. Structural member 200 may be a vertical stud of junction A of FIG. 1 for example.

For a 2 inch outside diameter conduit 202, a two inch (plus clearance) diameter bore 201 is made through structural member 200, which is a nominal 2×4 stud in this example. With the bore centered on the 3.5 inch face of the stud, approximately ¾ inch of material remains one each side of the bore. The stud is thus severely weakened at the area of the bore.

Figure 3:
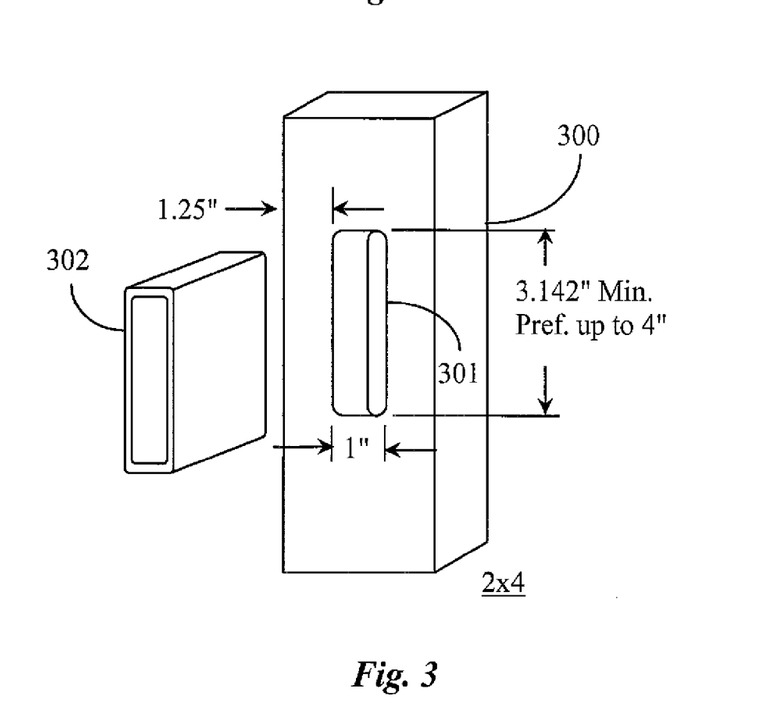
FIG. 3 is a perspective view of a conduit system route-through junction according to an embodiment of the present invention.

FIG. 3 is a perspective view of a conduit route-through junction according to an embodiment of the present invention. A 2×4 stud 300 is illustrated in this example, as in FIG. 2, and may represent one of the vertical members of junction A in FIG. 1. In this example, a conduit adapter section 302 is provided in place of the conduit 202. Conduit adapter 302 is rectangular rather than round. The width of conduit adapter 302 is 1 inch. The area of the round conduit in the example of FIG. 2 is 3.142 square inches. To avoid constricting the conduit in FIG. 3, causing loss of flow (in the case of gases or water), the area must be maintained, at least 3.142 square inches. So the height of the rectangular cross-section must be 3.142 inches minimum. Because of additional surface area inside the adapter section, and the change in dimensions, either of which may cause some flow constriction, a larger cross-section is desirable, so the height may in this case be as much as 4 inches.

Section 302 does not have to be of a rectangular cross-section in order to practice the invention as other shape may also provide a reduction on the bore requirement for a round conduit. An elliptical or oblong cross-section is also suitable for the application.

To accommodate adapter section 302 through member 300, a rectangular slot is made vertically through 2×4 300 and is just wider than 1 inch and of suitable length in order to accept section 302 therethrough. Slot 301 provides 1.25 inches on each side of the opening, rather than the ¾" as in the example of FIG. 2, leaving 2×4 300 much stronger at the junction than 2×4 200. Therefore, no additional structural support measures or materials are required to conform to building code. Section 302 represents a section of conduit that presents a cross-sectional profile that differs from that of conduit 202. The inventor provides connector pieces (not shown) that enable section 302 to be plumbed into the original conduit system as is detailed further below. Depending upon the nature of the construction, structural members may be of other sizes than two by four inch studs.

The total area of conduit 202 is at least maintained by conduit section 302 so that there is no bottleneck or reduction of volume rate at the junction point where the conduit is routed through the structural member. What is lost in diameter of the conduit is made up for in the length of the adapter section. The requirement for shoring up the framing member using metallic bracing is reduced or eliminated altogether. The inventor provides connectors that work to bridge the conduit system through one or more structural members as required using components of the system including conduit adapter sections similar to section 302.

Figure 4:
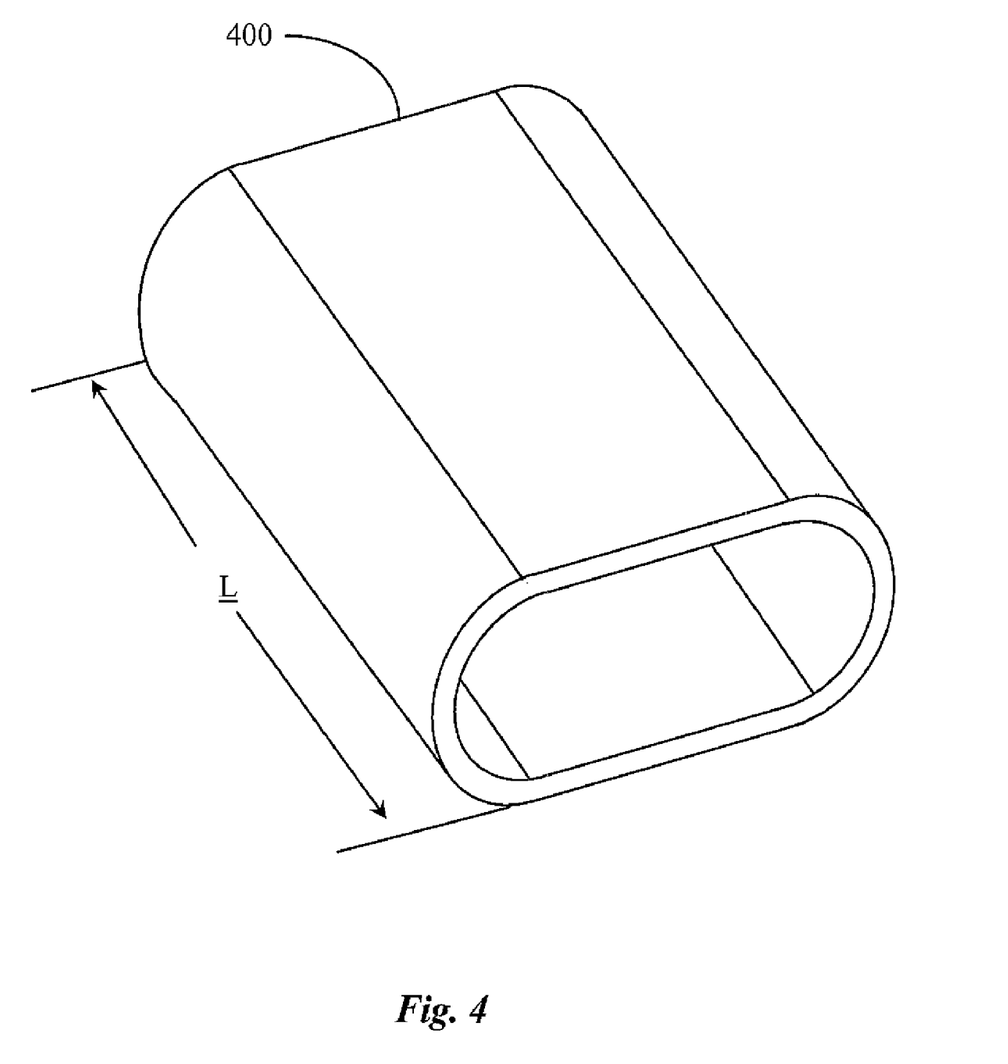
FIG. 4 is a perspective view of a conduit section with an oblong cross section according to an embodiment of the invention.

FIG. 4 is a perspective view of a conduit section 400 with a somewhat oblong cross-section according to an embodiment of the invention, rather than rectangular. Conduit section 400 may be extruded or molded and cut to varying lengths (L) for standard applications. Section 400 may have a nominal wall thickness that does not deviate from the standard thickness of the conduit it is adapted to bridge. The oblong shape of section 400 enables a reduction in the size of the cutout made through a structural member with reference to the width across the face of the structural member, just as shown above for the rectangular section. The area or volume of the conduit remains the same through the alternate profile of conduit section 400. There is no constriction to flow for fluids between the original round conduit and the oblong section that forms the bridging element for the conduit system through the structural member.

Figure 5:
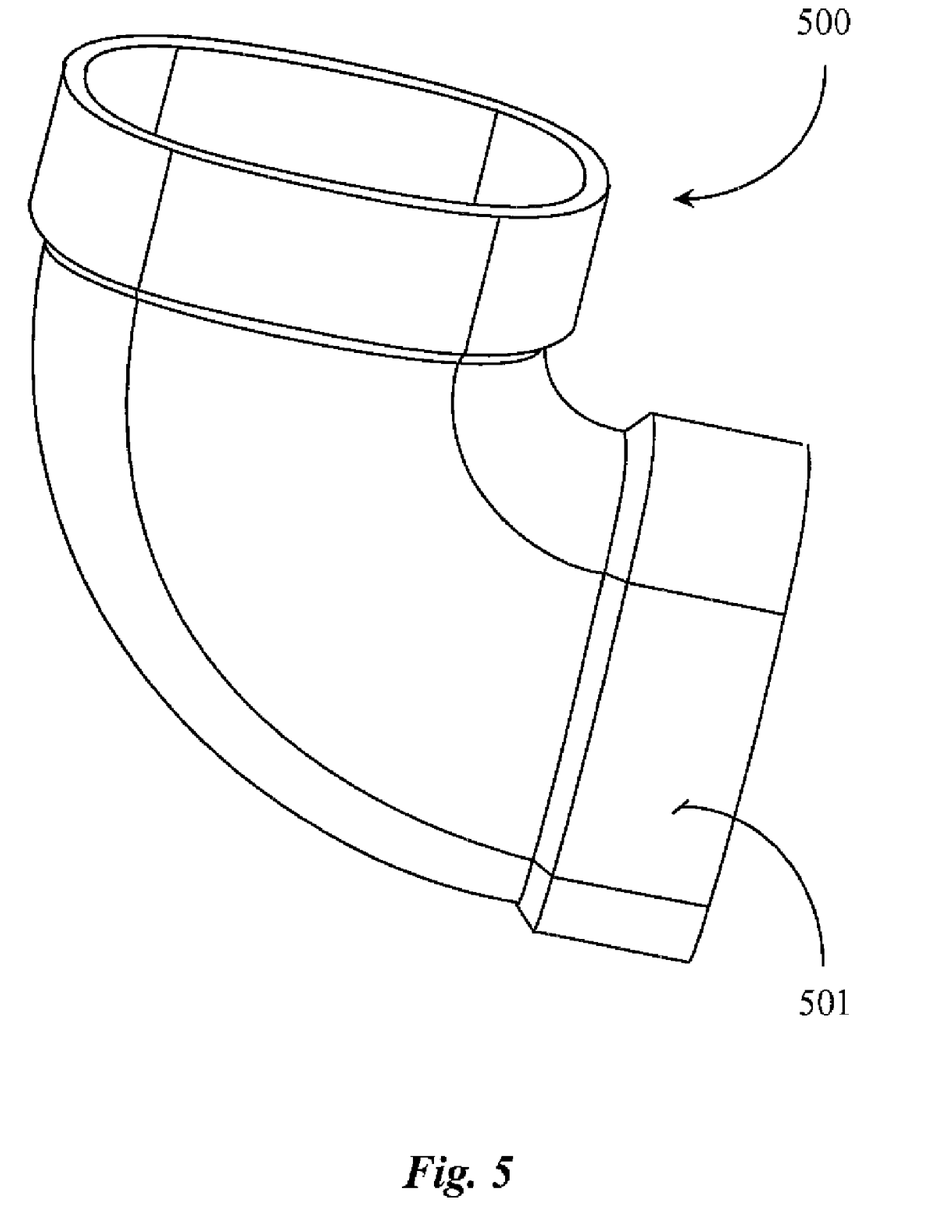
FIG. 5 is a perspective view of a conduit right-angle elbow with an oblong cross-section according to an embodiment of the present invention.

FIG. 5 is a perspective view of a conduit right-angle elbow 500 with an oblong cross-section according to an embodiment of the present invention. Elbow 500 represents one of the elements of the system of the invention that is provided for routing conduit where 90 degree angles are required in the planned conduit path.

Elbow 500 is adapted to couple at either or both ends 501 to a straight conduit section such as section 400 described above. Ends 501 are of the same cross-sectional profile as a straight section but are proportionally larger dimensionally so as to act as seats for the conduit section. Elbow 500 may be fabricated from polyvinyl chloride (PVC), ABS plastic, or other suitable plumbing materials. Elbow 500 may be molded. Each end of elbow 500 in this example serves as a female coupler into which the end of a conduit section such as section 400 may be pressed. The fit may be a tight press fit like with round PVC plumbing components. PVC cement or other adhesives may be used to secure the connections. Other materials may be used depending on what materials are suitable for which application.

Figure 6:
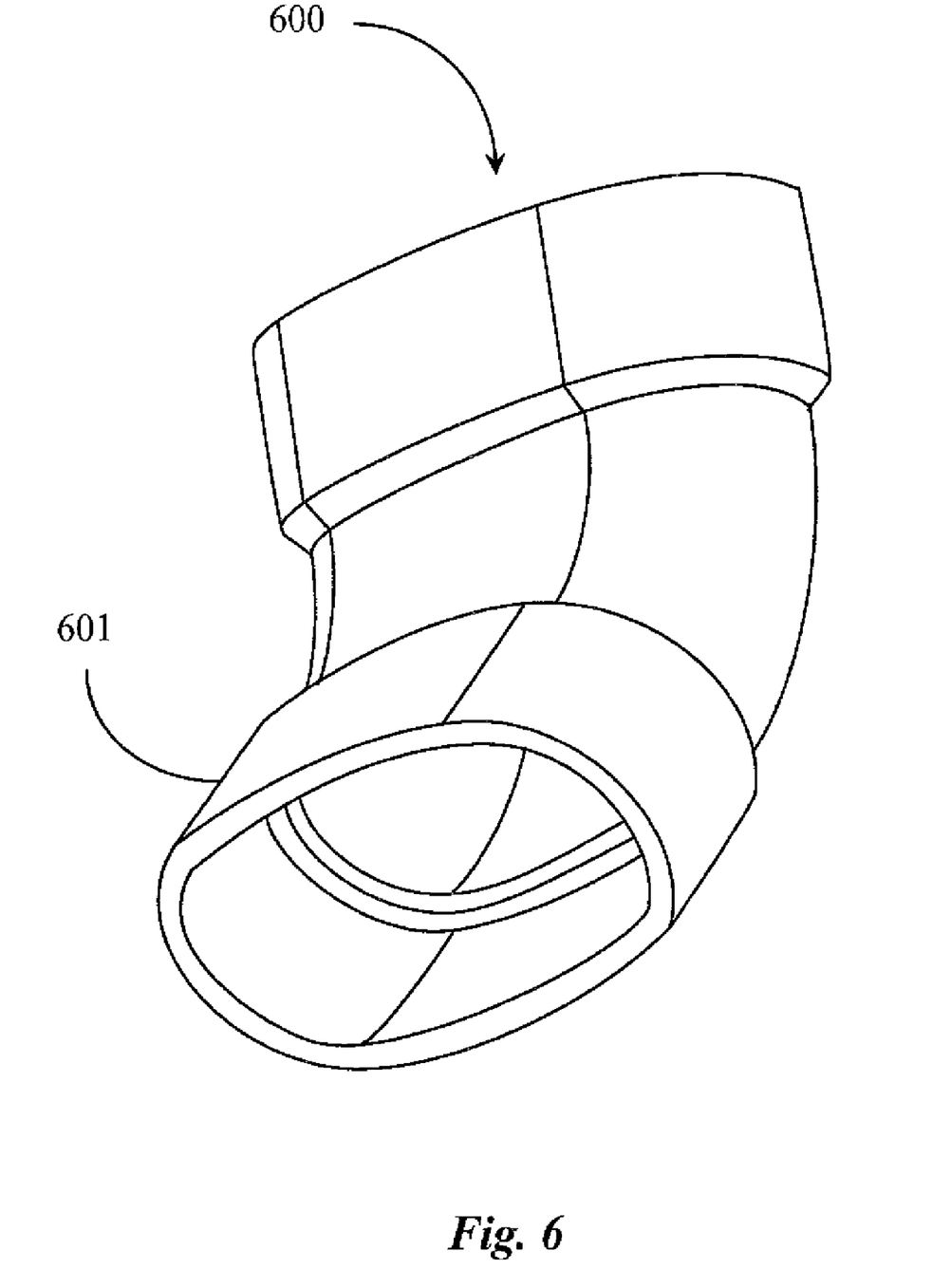
FIG. 6 is a perspective view of a conduit elbow with an oblong cross-section according to an embodiment of the invention.

FIG. 6 is a perspective view of a conduit elbow 600 with an oblong cross-sectional profile according to another embodiment of the invention. Elbow 600 is similar to elbow 500 described above accept for the angle of presentation. Elbow 600 may be a 15 degree or 30 degree elbow rather than a 90 degree elbow. Like elbow 500, elbow 600 is designed to accept a conduit section like section 400 into oversize seats 601. It is noted that the inner dimensioning of elbow ends 601 may be slightly larger than the outer dimensioning of the conduit section of the same profile to enable a hand-press fit like PVC components fit together.

One with skill in the art of plumbing will appreciate that there may be many different angles of presentation for elbows like elbow 500 and elbow 600. The inventor illustrates two such elbow configurations and deems them sufficient for the purpose of explaining the invention. It is noted herein that the angle of presentation for elbows may run horizontal or vertical with respect to the oblong cross-sectional profiles of the parts. For example, elbow 500 has an angle that lies in a plane parallel with the major axis of the oblong cross-section. Elbow 600 has an angle that lies in a plane parallel with the minor axis of the oblong cross-section. In this way, many different angle and direction can be incorporated by the system.

Figure 7:
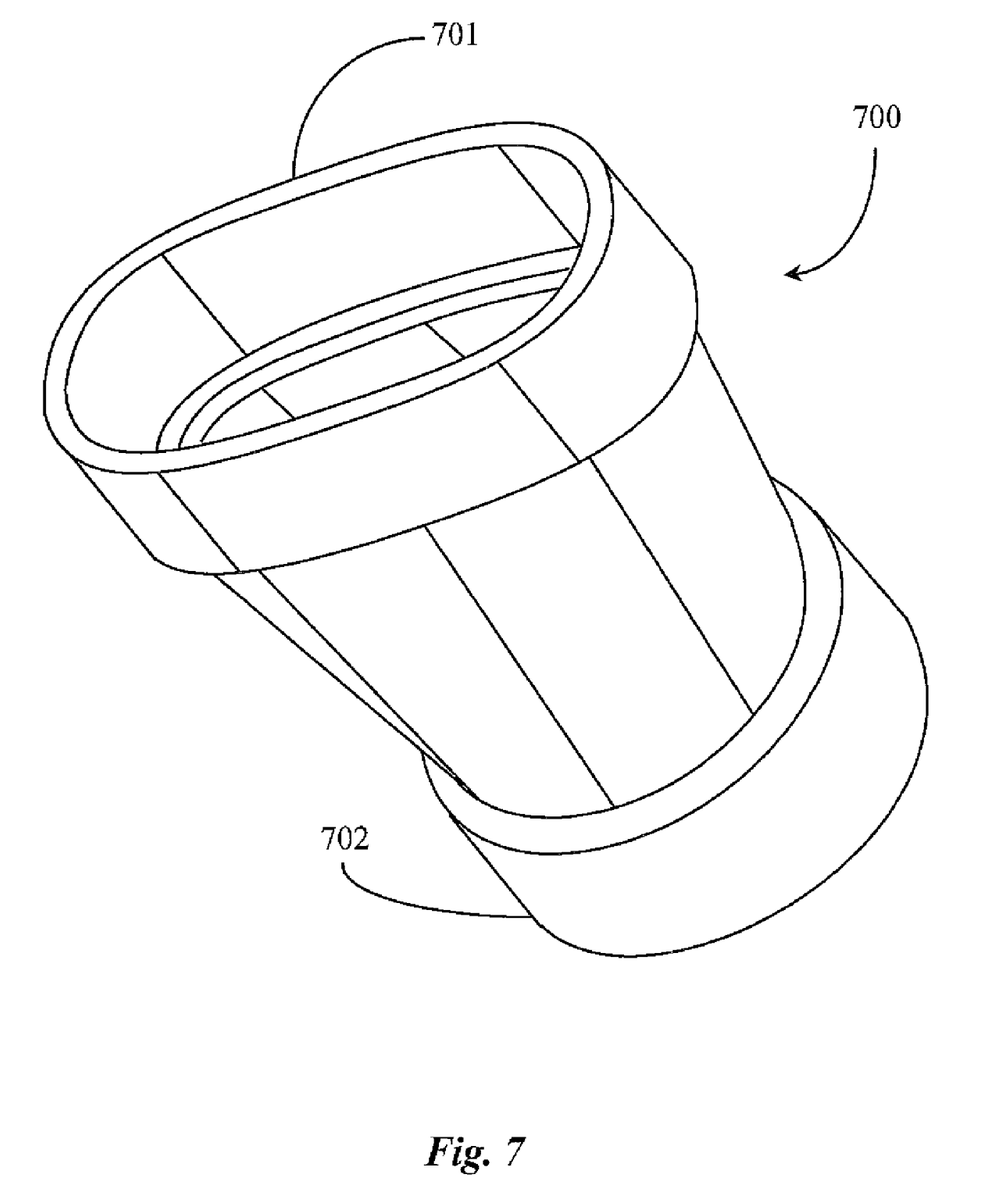
FIG. 7 is a perspective view of a transitional conduit connector according to an embodiment of the present invention.

FIG. 7 is a perspective view of a transitional conduit connector 700 according to an embodiment of the present invention. Connector 700 is adapted to couple to a round conduit at one end 702 and a conduit adapter section having an oblong cross-section at the other end 701. The materials and manufacturing methods for transitional connector 700 are consistent with those of elbows 500 and 600 described above.

The oblong cross-sectional profile at end 701 has an equivalent area to end 702, which has a round cross-sectional profile. The length of transitional connector 700 may vary and the actual transition from a round profile to an oblong profile may be prolonged or shortened by providing a longer or shorter connector. A transitional connector may be used on both sides of a structural member with only a straight conduit adapter section between them to bridge the conduit system through the structural member. No elbows are required in some simple embodiments.

Figure 8:
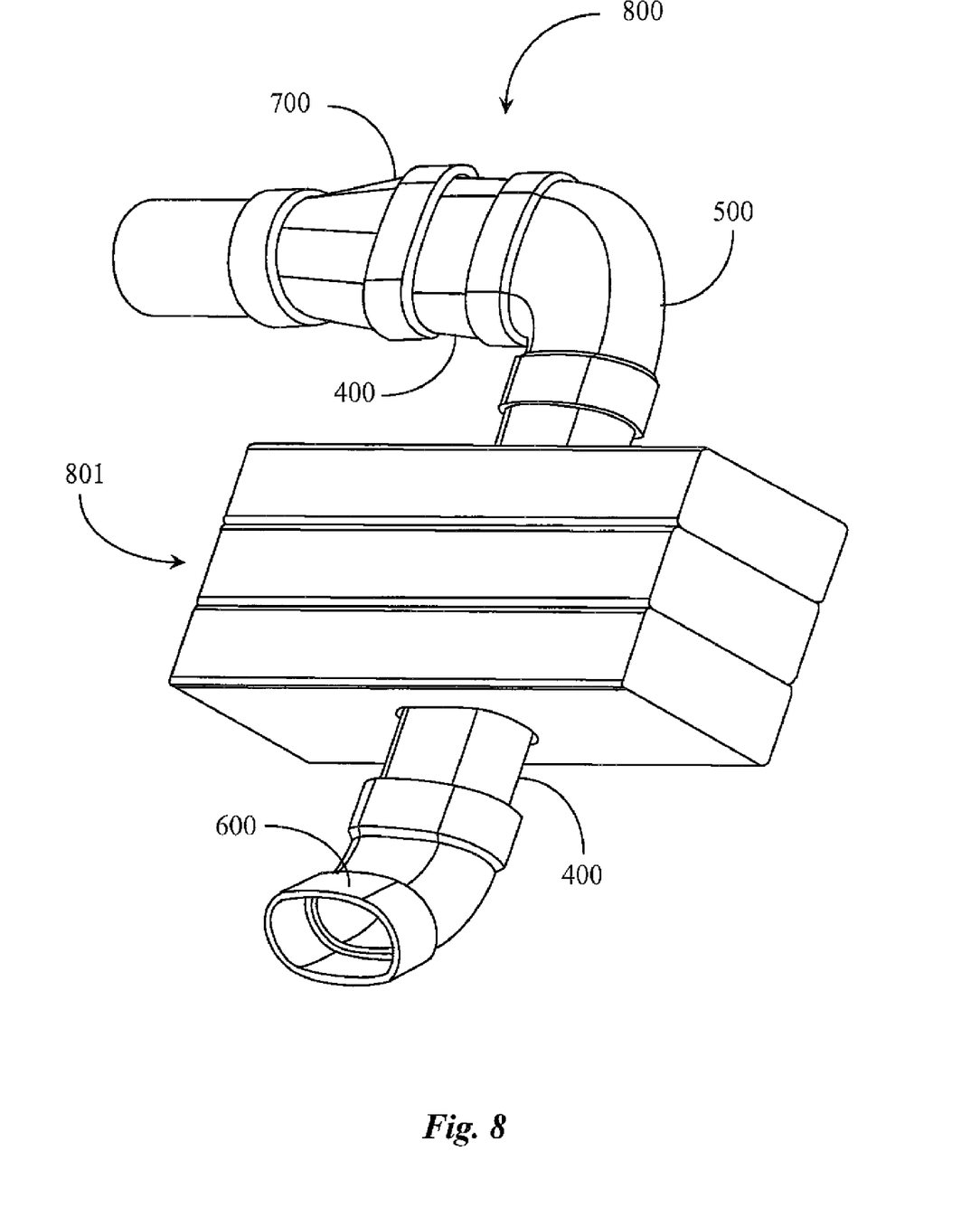
FIG. 8 is a perspective view of a conduit routing adapter system routed through a frame structural member of a construction according to an embodiment of the present invention.

FIG. 8 is a perspective view of a conduit system 800 routed through a compound frame structural member according to an embodiment of the present invention. A structural member 801 includes three adjacent 2×4s similar to junction A described above in FIG. 1. An oblong slot is cut through all three members with the major axis of the oblong shape in the direction of the length of the structural members. A straight conduit adapter section 400 of sufficient length is placed through the structure. At one end of the structure section 400 is coupled with a 90 degree elbow 500 of oblong cross-section. A shorter straight conduit section 400 is coupled to the elbow 500.

A transitional conduit adapter 700 is coupled to the shorter conduit section 400 at the oblong end and to the conventional conduit (round) at the other end. At the opposing side of the structure, oblong conduit section 400 is shown coupled to elbow 600. Elbow 600 may, in turn, be coupled to another short or long section 400 and then to a transitional conduit connector like connector 700.

In one embodiment of the invention, dependent upon application, conduit sections and connectors having the oblong cross-section can be extended well beyond the limits of a routing junction, becoming an integral part of the original conduit system at a junction point and in general under specific conditions. Conditions that might call for building a significant length of conduit outside of a local junction member might include multiple close junctions through which the system will be routed. In one case a conduit system might be routed through a structural member only at the last few feet of its length such as a drain to the outside, for example. In such a case, the conduit adapter system elements may not be transitioned back to a round cross-sectional profile, rather the outflow portion of the conduit may remain in an oblong shape.

It will be apparent to one with skill in the art that the invention may be used with original conduit systems that have a cross-sectional profile other than round like a square-tube conduit system. In such a case, different transitional conduit connectors may be provided. One with skill in the art will recognize that for some applications square tubing or conduit is preferable over round. The conduit adapter system may be used with conventional plumbing, draining systems, heating and air systems, and electrical wiring systems.

It will be apparent to one with skill in the art that the conduit adapter system of the invention may be provided using some or all of the described features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A conduit adapter system enabling routing of conduit through one or more structural members of width W with minimal weakening of the structural member or members, comprising:
    a section of round conduit having a diameter D on one side of the structural member or members; and
    a straight bridge conduit section of sufficient length to pass through the structural member or members, the bridge conduit section having a symmetrical cross-section with a first dimension significantly less than a second dimension, the first dimension less than the diameter D, and an area at least as large as the area of the round conduit sections;
    wherein the bridge conduit section passes through an opening through the structural member or members of substantially the shape of the cross-section of the bridge conduit section such that the first, smaller dimension of the opening is in the direction of width W of the structural member, and is joined by an adapter section to the round conduit section.

2. The conduit adapter system of claim 1 wherein the adapter section may be an elbow.

3. The conduit adapter system of claim 2 wherein adapting is by slip-fit and adhesive.

4. The conduit adapter system of claim 2 wherein the first dimension of the cross-section of the bridge conduit section is approximately half of the diameter of the round conduit.

5. In a conduit system comprising mostly round conduit sections of common diameter D, a method for routing through a structural member of width W with minimum weakening of the structural member, comprising steps of:
    (a) providing a straight bridge conduit section of sufficient length to pass through the structural member, the bridge conduit section having a symmetrical cross-section with a first dimension significantly less than a second dimension, the first dimension less than the diameter D, and a cross-sectional area at least as large as the cross-sectional area of the round conduit sections;
    (b) forming an opening through the structural member of substantially the shape of the cross-section of the bridge conduit section such that the first, smaller dimension of the opening is in the direction of width W of the structural member;
    (c) passing the bridge conduit section through the opening in the structural member; and
    (d) joining the bridge conduit section to one of the round conduit sections with an adapter unit having the round conduit shape at one end and the bridge cross-section shape at the other.

6. The method of claim 5 wherein the structural member is a wood frame member.

7. The method of claim 5 wherein the conduit is plumbing pipe.

8. The method of claim 5 wherein in step (d) joining is by press fit and glue.

\* \* \* \* \*